(12) United States Patent
Heo

(10) Patent No.: US 8,895,855 B2
(45) Date of Patent: Nov. 25, 2014

(54) SIGNAL TRANSFER APPARATUS

(71) Applicant: Samsung Electronics Co., Ltd., Suwon-si (KR)

(72) Inventor: Jung-woo Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/188,930

(22) Filed: Feb. 25, 2014

(65) Prior Publication Data

US 2014/0168528 A1 Jun. 19, 2014

Related U.S. Application Data

(63) Continuation of application No. 12/607,146, filed on Oct. 28, 2009, now Pat. No. 8,710,370.

(30) Foreign Application Priority Data

Mar. 12, 2009 (KR) .................. 10-2009-0021271

(51) Int. Cl.
*H02G 15/08* (2006.01)
*H04N 5/64* (2006.01)
*H01R 24/58* (2011.01)
*H01R 31/00* (2006.01)
*H01R 11/11* (2006.01)
*H01R 31/06* (2006.01)
*H01R 105/00* (2006.01)
*H01R 31/02* (2006.01)

(52) U.S. Cl.
CPC .................. *H01R 11/11* (2013.01); *H04N 5/64* (2013.01); *H01R 2105/00* (2013.01); *H01R 31/02* (2013.01); *H01R 24/58* (2013.01); *H01R 31/005* (2013.01); *H01R 31/06* (2013.01)
USPC ................. 174/72 R; 174/88 R; 174/113 R; 174/72 A; 439/623; 439/626

(58) Field of Classification Search
USPC ...... 174/72 A, 72 R, 72 TR, 88 R, 102 R, 95, 174/113 R, 114 R, 117 F, 103, 110 R, 71 R; 439/623, 624, 626, 685, 669, 502, 639; 666/72 A, 72 R, 72 TR, 88 R, 102 R, 95, 666/113 R, 114 R, 117 F, 103, 110 R, 71 R
See application file for complete search history.

(56) References Cited

U.S. PATENT DOCUMENTS 5,168,124 A 12/1992 Takase
5,203,720 A 4/1993 Zini
(Continued)

FOREIGN PATENT DOCUMENTS

EP 0854550 A2 7/1998
JP 2003-077580 A 3/2003
(Continued)

OTHER PUBLICATIONS

Communication dated Aug. 16, 2012, issued by the Korean Intellectual Property Office in Korean Application No. 10-2009-0021271.
(Continued)

*Primary Examiner* — Angel R Estrada
(74) *Attorney, Agent, or Firm* — Sughrue Mion, PLLC

(57) ABSTRACT

A cable having a first input connector, a second input connector, a third input connector, and a single output connector is provided. The single output connector includes a single pin-shaped output terminal comprising a base and a tip which is disposed opposite to the base and is insertable into a terminal of a television apparatus. A luminance signal is received via the first input connector of the cable; a first color difference signal is received via the second input connector of the cable; and a second color difference signal is received via the third input connector of the cable. The luminance signal is output via a first region of the pin-shaped output terminal; the first color difference signal is output via a second region of the pin-shaped output terminal; and the second color difference signal is output via a third region of the pin-shaped output terminal.

8 Claims, 3 Drawing Sheets

(56) References Cited

U.S. PATENT DOCUMENTS

| | | | |
|---|---|---|---|
| 5,546,950 | A | 8/1996 | Schoeckert |
| 5,547,399 | A | 8/1996 | Naghi |
| 5,790,896 | A | 8/1998 | Nguyen |
| 5,937,950 | A | 8/1999 | Adams |
| 6,069,960 | A | 5/2000 | Mizukami et al. |
| 6,231,379 | B1 | 5/2001 | Shen |
| 6,530,085 | B1 | 3/2003 | Perlman |
| 6,800,810 | B1 | 10/2004 | Page |
| 6,907,615 | B1 | 6/2005 | Alexander et al. |
| 7,040,823 | B2 | 5/2006 | Silverbrook |
| 7,440,035 | B2 | 10/2008 | Mori |
| 7,521,634 | B2 | 4/2009 | Clem |
| 7,736,193 | B2 | 6/2010 | Edeler et al. |
| 2004/0206528 | A1 | 10/2004 | Wu et al. |
| 2006/0234546 | A1 | 10/2006 | Mori |
| 2008/0045073 | A1 | 2/2008 | Kuo |
| 2008/0188122 | A1 | 8/2008 | Edeler et al. |
| 2009/0156036 | A1 | 6/2009 | Lee |
| 2012/0225580 | A1 | 9/2012 | Seo |

FOREIGN PATENT DOCUMENTS

| | | | |
|---|---|---|---|
| JP | 2006-331842 A | | 12/2006 |
| JP | 2007-227048 A | | 9/2007 |
| KR | 20-0270456 Y1 | | 4/2002 |
| KR | 10-2006-0030147 A | | 4/2006 |
| KR | 10-2007-0096087 A | | 10/2007 |
| KR | 1020130024941 A1 | | 3/2013 |
| WO | 2006/079958 A1 | | 8/2006 |

OTHER PUBLICATIONS

Communication dated Oct. 2, 2012, issued by the European Patent Office in counterpart European Application No. 09174577.8.
Communication dated Oct. 4, 2012, issued by the U.S. Patent and Trademark Office in U.S. Appl. No. 13/469,901.
Communication dated Feb. 12, 2013, issued by the U.S. Patent and Trademark Office in related U.S. Appl. No. 13/469,901.
Office Action dated Jun. 6, 2013, issued by the U.S. Patent and Trademark Office in related U.S. Appl. No. 13/469,901.
Communication, dated Jul. 15, 2013, issued by the European Patent Office, in counterpart Application No. 09174577.8.
Communication, dated Sep. 28, 2013, issued by the Korean Intellectual Property Office, in counterpart Application No. 1020090021271.
Office Action dated Jan. 10, 2014, issued by the U.S. Patent and Trademark Office in related U.S. Appl. No. 13/469,901.
Communication dated Oct. 24, 2012, issued by the United States Patent and Trademark Office in counterpart U.S. Appl. No. 12/607,146.
Communication dated Apr. 12, 2013, issued by the United States Patent and Trademark Office in counterpart U.S. Appl. No. 12/607,146.
Communication dated Aug. 5, 2013, issued by the United States Patent and Trademark Office in counterpart U.S. Appl. No. 12/607,146.
Communication dated Jun. 10, 2014, issued by the United States Patent and Trademark Office in counterpart U.S. Appl. No. 13/469,901.
Communication dated Aug. 13, 2014 issued by the European Patent Office in counterpart European Patent Application No. 09 174 577.8.

SIGNAL TRANSFER APPARATUS

CROSS-REFERENCE TO RELATED APPLICATIONS

This application is a continuation of U.S. patent application Ser. No. 12/607,146 filed Oct. 28, 2009 which claims priority from Korean Patent Application No. 10-2009-0021271, filed Mar. 12, 2009, in the Korean Intellectual Property Office. The disclosures of these applications are incorporated herein by reference in their entireties.

BACKGROUND

1. Field

Apparatuses consistent with the exemplary embodiment relate to transferring signals, and more particularly, to a signal transfer apparatus which transfers a plurality of signals output from an electronic device to another electronic device.

2. Description of the Related Art

Image signals or audio signals output from an electronic device need to be transferred to another electronic device to operate the electronic devices in association with each other. For example, image signals are transferred from a digital versatile disk (DVD) player or a set-top box to a television (TV) to reproduce the image signals. When an image signal is transferred as a component type, three component signals including a luminance signal Y and color difference signals Pb and Pr are transmitted to a TV, which includes terminals to receive such signals. There are various signal transfer methods other than a component type such as a composite type, and thus a TV should include various terminals to receive signals transferred in various manners.

Recently, there have been many efforts to miniaturize electronic devices. For example, it may be necessary to miniaturize an electronic device to fabricate electronic devices such as a thin wall-mounted TV. For the miniaturized electronic devices, the size and number of terminals to transmit and receive signals to and from another electronic device need to be reduced.

Additionally, the terminals are typically disposed on a rear surface of the electronic device. Electronic devices such as a wall-mounted TV are fixedly mounted on a wall. The wall-mounted TV includes cables to transfer audio signals or image signals and connectors to connect the wall-mounted TV to external devices, and these cables and connectors may make it difficult to closely attach the wall-mounted TV to the wall. Accordingly, there is a need for a connector that facilitates close attachment of the wall-mounted TV to a wall.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide a signal transfer apparatus to reduce the size and number of terminals of an electronic device.

According to an aspect of an exemplary embodiment, there is provided a signal transfer apparatus, including a plurality of input connectors to which a plurality of signals are input; and a single output connector which is connected to the plurality of input connectors and outputs the plurality of signals.

The length of a plurality of cables connecting the single output connector and the plurality of input connectors may differ from each other so that the plurality of input connectors do not overlap each other.

The single output connector may include an output terminal which is connected to the second electronic device; wherein the output terminal may include a plurality of signal regions which are connected to the plurality of signals input to the plurality of input connectors, respectively; and a ground region which is connected to grounds of the plurality of input connectors.

The plurality of signal regions and the ground region may be formed lengthwise along the single output terminal.

An insulating material may be disposed between the plurality of signal regions and the ground region.

The output terminal may be formed in a pin shape.

The plurality of input connectors may include a first input connector to which a luminance signal Y is input; a second input connector to which a first color difference signal Pb is input; and a third input connector to which a second color difference signal Pr is input.

The length of the plurality of cables connecting the single output connector and the first, second, and third input connectors may differ from each other.

The single output connector may include an output terminal which is connected to the second electronic device; a first signal region which is connected to the luminance signal Y; a second signal region which is connected to the first color difference signal Pb; a third signal region which is connected to the second color difference signal Pr; and a ground region which is connected to grounds of the first, second, and third input connectors.

The first, second, and third signal regions and the ground region may be formed lengthwise along the output terminal.

An insulating material may be disposed between the first, second, and third signal regions and the ground region.

The plurality of input connectors may be connected to external cables.

The plurality of input connectors may be formed as a female connector.

The plurality of signals may include at least one image signal.

The second electronic device may be a television (TV).

The TV may include a terminal into which the output connector is inserted.

The inserting direction of the output connector may be parallel with a display plane of the TV.

BRIEF DESCRIPTION OF THE DRAWINGS

The above and other aspects will be more apparent by describing certain exemplary embodiments with reference to the accompanying drawings, in which.

DETAILED DESCRIPTION OF EXEMPLARY EMBODIMENTS

Figure 1:
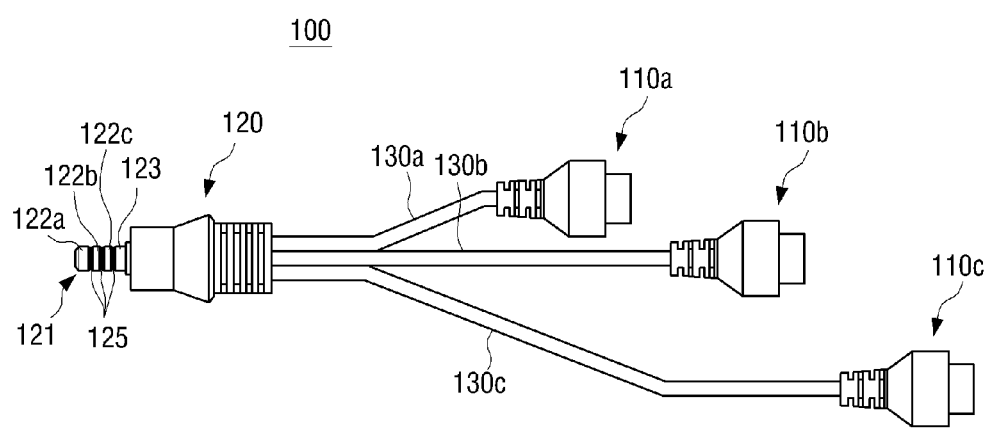
FIG. 1 is a schematic view of a signal transfer apparatus according to an exemplary embodiment.

Exemplary embodiments are described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, it is apparent that the present invention can be practiced without those specifically defined matters. Also, well-known functions or constructions are not described in detail since they would obscure the invention with unnecessary detail.

An exemplary embodiment relates to a signal transfer apparatus which transfers a plurality of signals from a first electronic device to a second electronic device. In this exemplary embodiment, a signal transfer apparatus transfers a plurality of image signals output from a digital versatile disk (DVD) player or a set-top box corresponding to the first electronic device to a TV corresponding to the second electronic device in a component type signal transfer. However, embodiments are not limited to these electronic devices. In addition, embodiments may also be used to transfer audio signals or other signals other than image signals.

Figure 2:
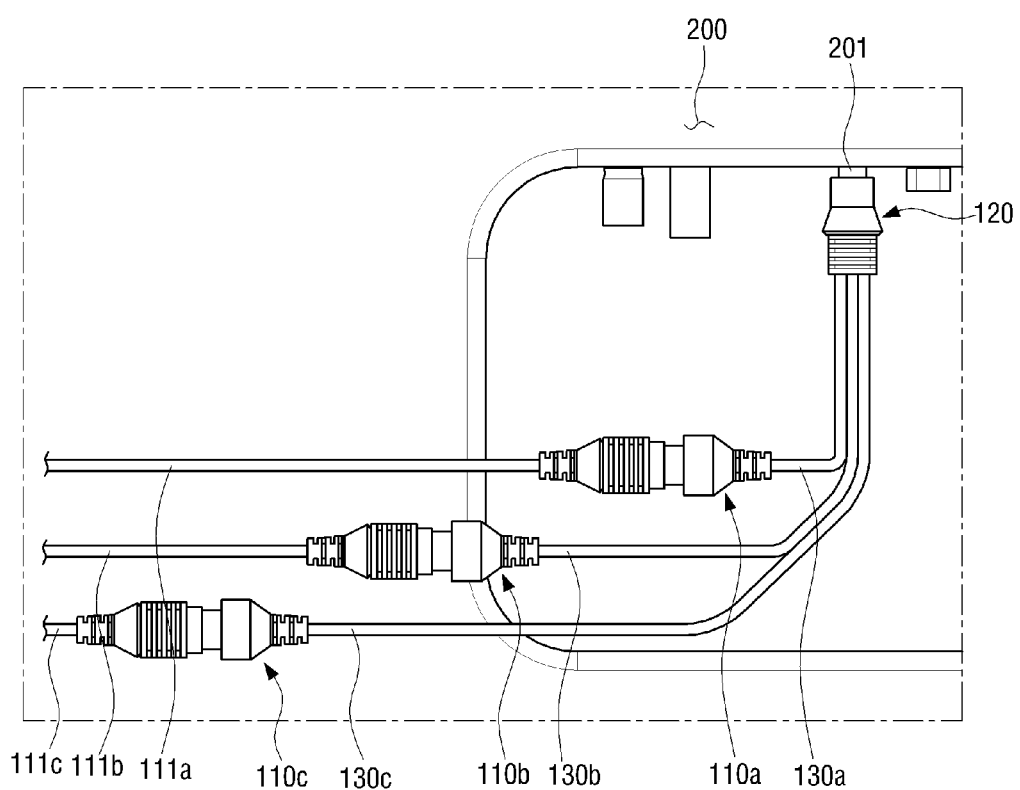
FIG. 2 is a schematic view of the signal transfer apparatus of FIG. 1 coupled to an electronic device.
Figure 3:
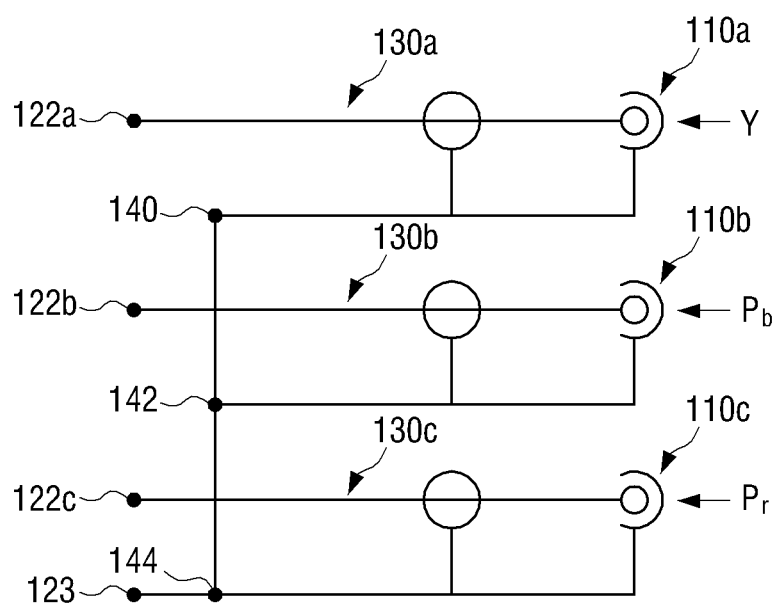
FIG. 3 is a circuit diagram of the signal transfer apparatus of FIG. 1.

FIG. 1 is a schematic view of a signal transfer apparatus 100 according to an exemplary embodiment, FIG. 2 is a schematic view in which the signal transfer apparatus 100 of FIG. 1 is coupled to an electronic device (TV 200), and FIG. 3 is a circuit diagram of the signal transfer apparatus 100 of FIG. 1.

The signal transfer apparatus 100 according to an exemplary embodiment includes a plurality of input connectors 110a, 110b, 110c, a single output connector 120, and a plurality of cables 130a, 130b, 130c.

A plurality of signals output from the first electronic device, such as a DVD player or a set-top box, is input to the plurality of input connectors 110a, 110b, 110c. The image signals are transferred as a component type in this exemplary embodiment. The signal transfer apparatus 100 includes the first input connector 110a to which a luminance signal Y is input, the second connector 110b to which a first color difference signal Pb is input, and the third connector 110c to which a second color difference signal Pr is input. Referring to FIG. 2, the first electronic device (not shown) is connected to the plurality of input connectors 110a, 110b, 110c through external cables 111a, 111b, 111c, and the second electronic device (TV) 200 is connected to the output connector 120.

Because three component signals Y, Pb, Pr are transferred in this exemplary embodiment, three input connectors 110a, 110b, 110c are used. However, the number of input connectors is not limited thereto, and, if the number of signals to be transferred is increased or reduced, more or less input connectors may be used.

The single output connector 120 is connected to all the input connectors 110a, 110b, 110c, and transfers the plurality of signals to the second electronic device, such as the TV 200. The number of input connectors 110a, 110b, 110c is plural, but only one output connector 120 is provided as shown in FIGS. 1 and 2. As described in detail below, the output connector 120 includes a plurality of signal regions 122a, 122b, 122c which are respectively connected to the cables 130a, 130b, 130c and receive the signals input to the input connectors 110a, 110b, 110c via the cables 130a, 130b, 130c. Accordingly, in the exemplary embodiment, a single output connector 120 is used to transfer the plurality of signals.

Therefore, the TV 200 includes only one terminal 201 to receive the luminance signal Y and the first and second color difference signals Pb, Pr from the output connector 120, as shown in FIG. 2. Because the TV 200 according to the exemplary embodiment requires a lesser number of terminals, e.g., only one terminal 201, the TV 200 may be miniaturized and/or slimmer.

The cables 130a, 130b, 130c connects the single output connector 120 to the input connectors 110a, 110b, 110c. Referring to FIG. 1, the length of each of the cables 130a, 130b, 130c differs from each other so that the input connectors 110a, 110b, 110c are staggered and do not overlap each other. In other words, in order to prevent the input connectors 110a, 110b, 110c from overlapping, except for the shortest cable, the length of each of the cables 110a, 110b, 110c is successively longer than the next shortest cable. For example, the length of the cables may be selected so that a difference in length between two cables is at least greater than a length of the input connectors 110a, 110b, 110c, or greater than a sum of the length of the input connectors 110a, 110b, 110c and a length of output connectors of the cables 111a, 111b, 111c coupled to the input connectors 110a, 110b and 110c. FIG. 2 illustrates the input connectors 110a, 110b, 110c which do not overlap each other.

If the length of the cables 130a, 130b, 130c is the same, the input connectors 110a, 110b, 110c may overlap each other and thus the overlapped input connectors 110a, 110b, 110c may occupy a substantial volume behind the TV 200. For example, if the TV 200 is a wall-mounted TV, the overlapped input connectors 110a, 110b, 110c may be disposed between a rear surface of the wall-mounted TV and a wall, and, thus, the overlapped input connectors 110a, 110b, 110c may occupy a substantial space between the rear surface and the wall. Accordingly, it may be difficult to closely attach the TV 200 to the wall. Although only three input connectors 110a, 110b, 110c are provided in this exemplary embodiment, the wall-mounted TV may require more input connectors. That is, because the number of peripheral devices connected to the TV 200 may be increased, transfer of various signals such as audio signals other than image signals may be required. Even with a large number of input connectors, the signal transfer apparatus 100 according to the exemplary embodiment facilitates close attachment of the wall-mounted TV to the wall because the input connectors 110a, 110b, 110c do not overlap each other.

Referring to FIG. 1, the single output connector 120 includes an output terminal 121, the signal regions 122a, 122b, 122c, and a ground region 123.

The output terminal 121 is inserted into the terminal 201 of the TV 200 to be connected to the TV 200, as shown in FIG. 2. That is, the inserting direction of the output terminal 121 is parallel to a display plane of the TV 200. Accordingly, although the output terminal 121 is inserted into the terminal 201, the space between the rear surface of the TV 200 and the wall to accommodate the output connector 120 is minimized so that the TV 200 may be more closely attached to the wall. The output terminal 121 is formed in a pin shape as shown in FIG. 1, but the output terminal 121 may be configured in various shapes.

The signal regions 122a, 122b, 122c receive the signals from the input connectors 110a, 110b, 110c, respectively, via the cables 110a, 110b, 110c. Referring to FIG. 3, the first signal region 122a receives and outputs the luminance signal Y through the first input connector 110a, the second signal region 122b receives and outputs the first color difference signal Pb through the second input connector 110b, and the third signal region 122c receives and outputs the second color difference signal Pr through the third input connector 110c.

The ground region 123 is connected to ground points 140, 142, 144 of the first, second, and third input connectors 110a, 110b, 110c, as shown in FIG. 3.

The first, second, and third signal regions 122a, 122b, 122c, and the ground region 123 are formed lengthwise along the output terminal 121 as shown in FIG. 1. Accordingly, although only one output terminal 121 is provided, each signal Y, Pb, Pr is individually transferred to the TV 200. An insulating material 125 is disposed between the first, second, and third signal regions 122a, 122b, 122c and the ground region 123. The insulating material 125 obviates the plurality of signals from being jammed up.

According to the exemplary embodiment as described above, the plurality of signals Y, Pb, Pr is transferred to the TV 200 using a single output connector 120 so that the TV 200 needs only one terminal 201 to connect the output connector 120. Accordingly, the number of the terminals mounted to the TV 200 is reduced, and thus it allows the TV 200 to be miniaturized. Moreover, as the lengths of the plurality of cables 130a, 130b, 130c connecting the output connector 120 and the plurality of input connectors 110a, 110b, 110c differ from each other, the input connectors 110a, 110b, 110c do not overlap. Therefore, if the TV 200 according to an exemplary embodiment is a wall-mounted TV, the wall-mounted TV may be closely attached to the wall. The TV 200 according to an exemplary embodiment may be a light emitting diode (LED) TV, which is a substantially thin device.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method comprising:
   providing a cable having a first input connector, a second input connector and a third input connector and a single output connector, the single output connector including a single pin-shaped output terminal comprising a base and a tip which is disposed opposite to the base and is insertable into a terminal of a television apparatus;
   receiving a luminance signal via the first input connector of the cable;
   receiving a first color difference signal via the second input connector of the cable;
   receiving a second color difference signal via the third input connector of the cable;
   outputting the luminance signal via a first region of the pin-shaped output terminal;
   outputting the first color difference signal via a second region of the pin-shaped output terminal; and
   outputting the second color difference signal via a third region of the pin-shaped output terminal,
   wherein the first region, the second region, and the third region are sequentially formed lengthwise, in this order, from the tip to the base along the single pin-shaped output terminal.

2. The method as claimed in claim 1, wherein an insulating material is disposed between the first region and the second region; and
   an insulating material disposed between the second region and the third region.

3. The method as claimed in claim 2, wherein an insulating material is disposed between the third region and a ground region.

4. The method as claimed in claim 1, further comprising:
   inserting the single pin-shaped output terminal into the terminal of the television apparatus in an inserting direction parallel to a back cover of the television apparatus.

5. The method as claimed in claim 1, wherein the first input connector, the second input connector, and the third input connector are the only connectors attached to the single pin-shaped output terminal.

6. The method as claimed in claim 1, further comprising:
   arranging the first input connector, the second input connector, and the third input connector lengthwise with respect to one another so that the first input connector, the second input connector, and the third input connector do not overlap one another, while the tip of the single pin-shaped output terminal is inserted into the terminal of the television, thereby facilitating a close attachment of the television to a wall.

7. The method as claimed in claim 6, further comprising:
   arranging the first input connector at a first length from the base of the single pin-shaped output terminal;
   arranging the second input connector at a second length from the base of the single pin-shaped output terminal; and
   arranging the third input connector at a third length from the base of the single pin-shaped output terminal,
   wherein any one of the first length, the second length and the third length is different from one another.

8. The method as claimed in claim 7, wherein the second length is greater than the first length by at least a length of the first input connector, and
   the third length is greater than the second length by at least a length of the second input connector, so that the first, second and third input connectors do not overlap one another while being arranged lengthwise with respect to one another.

* * * * *